Jan. 20, 1959 N. E. SHURTLIFF 2,869,822
LOGGING CABLE HAULBACK APPARATUS
Filed Jan. 15, 1952
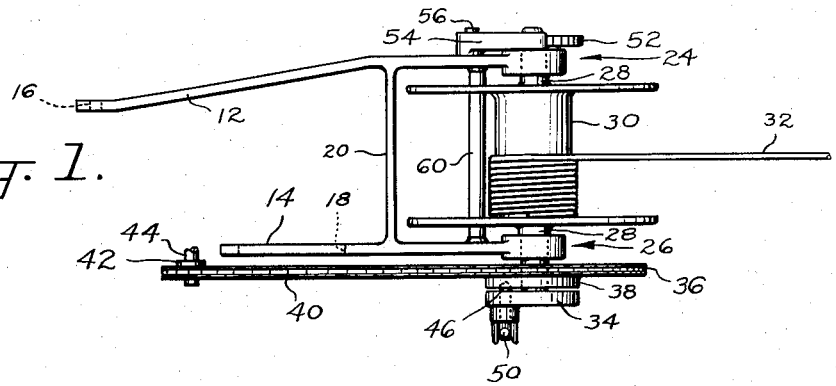
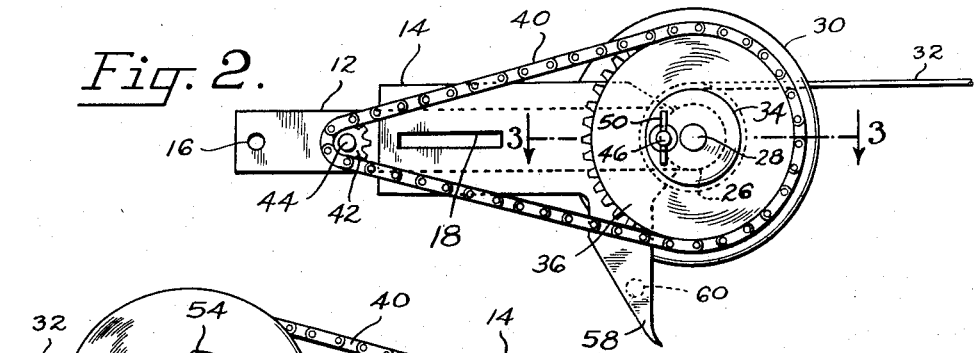
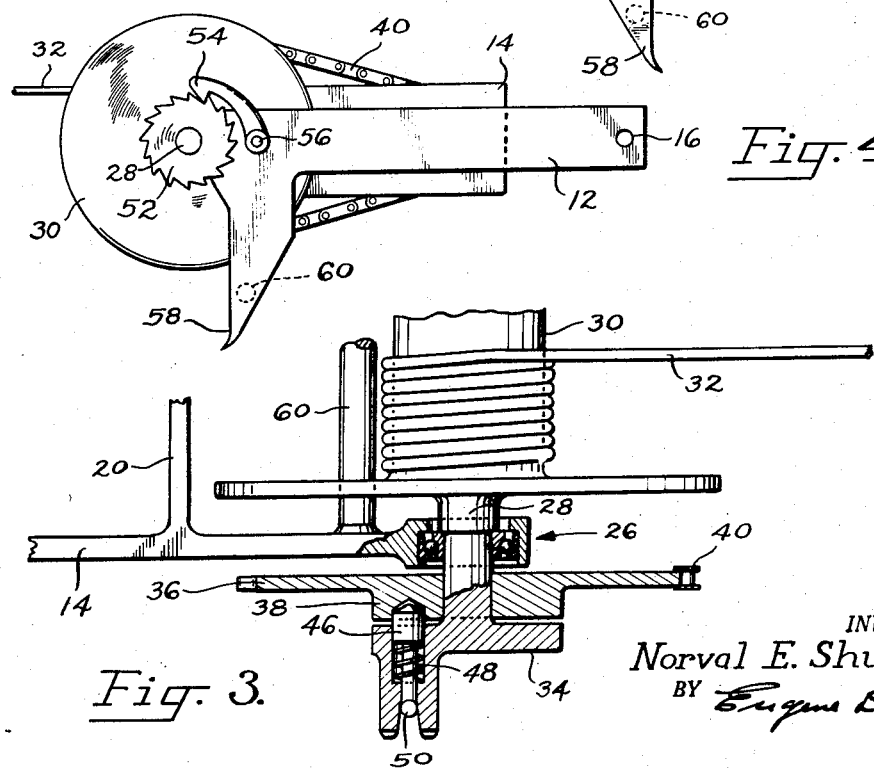
INVENTOR.
Norval E. Shurtliff
BY

2,869,822
LOGGING CABLE HAULBACK APPARATUS

Norval E. Shurtliff, Lowell, Oreg.

Application January 15, 1952, Serial No. 266,509

1 Claim. (Cl. 254—150)

The present invention relates to logging cable haulback apparatus for use in returning the table to the situs of the tree felling operation after it has been employed to drag a log to a central loading station.

In logging with a caterpillar tractor it is conventional practice to fell and buck a number of trees with a chain saw. Chokers and a drum line then are attached to a given log and the line taken up on the drum of the tractor, thereby dragging the log to a central point where it may be loaded on a truck or railroad car. The chokers and drum line then are returned to the log location and attached to another log which likewise is dragged to the tractor. This sequence of operations is repeated until all of the logs have thus been gathered together and loaded.

Since the chokers and drum line comprise heavy cables, it is a substantial and time-consuming chore to return them to the log location and in some logging operations, it is accomplished by means of a special line and block operated by a donkey engine. However, when logging with a tractor, it has been customary to return them manually. This task is particularly difficult of consummation where the logs are located on the side of a steep hill or ravine.

It, therefore, is a principal object of the present invention to provide apparatus for returning the chokers and drum line to the log location.

It is another important object of the present invention to provide apparatus for hauling back the chokers and drum line which makes practical the recovery of logs in inaccessible locations and in areas where the ground is wet and soft.

Still another object of this invention is the provision of logging cable haulback apparatus which is operable without installation of a special haulback rigging and motor.

Still another object of this invention is the provision of logging cable haulback apparatus which is attachable to and operable by the power unit of any of the conventional chain saws used conventionally in logging operations.

A further object of this invention is the provision of logging cable haulback apparatus which is simple in construction and easy to operate.

The manner in which the foregoing and other objects of this invention are accomplished will be apparent from the following specification and claim considered together with the accompanying drawings, wherein like numerals of reference indicate like parts, and wherein:

Figure 1 is a plan view of the presently described logging cable haulback apparatus;

Figure 2 is a view in side elevation of the logging cable haulback apparatus of this invention;

Figure 3 is a detail view partly in section taken the lines 3—3 of Figure 2 further illustrating the logging cable haulback apparatus of the present invention; and Figure 4 is a view in elevation of the side of the presently described haulback apparatus opposite to that illustrated in Figure 2.

Referring to the drawings, it will be seen that the logging cable haulback apparatus of my invention comprises a pair of horizontally spaced apart frame members 12, 14. These are perforated respectively at 16 and 18 for the reception of bolts by means of which the apparatus may be attached to the power unit of a conventional chain saw, for example, a McCulloch chain saw.

The frame members 12, 14 are maintained spaced apart by the cross piece 20. At their extremities are a pair of bearings 24, 26 in which is journaled shaft 28.

Shaft 28 is somewhat longer than the distance between bearings 24, 26 and therefore extends entirely through these bearings. Rigidly mounted upon it intermediate the frame members is the reel or drum 30 having a capacity sufficient to hold the desired amount of line 32. The latter may comprise any suitable type of flexible connection, but preferably comprises one-eighth inch airplane cable, which is both light and strong.

Rigidly affixed to an outer end of shaft 28 is the plate 34 having therethrough a transverse perforation. Slidably mounted on the same end of shaft 28 but between bearing 26 and plate 34 is a sprocket 36. Sprocket 36 preferably has attached to its outer face a perforated plate or boss 38, the perforations in plates 34 and 38 being dimensioned so that they may be placed in substantial registration with each other. Sprocket 36 then is connected through a chain 40 to a sprocket 42 which in turn is rigid on the drive shaft 44 of the chain saw.

Operation of the chain saw motor therefore drives sprocket 36 on the haulback apparatus, the sprocket turning freely on shaft 28. However, means are provided for releasably interconnecting sprocket 36 with plate 34 with the result that when these two members are interconnected, rotation of the sprocket drives reel 30.

The clutch mechanism employed for this purpose comprises sprocket 36, plate 34, and a pin 46, which preferably is spring-pressed by spring 48. Spring 48 is seated within the perforation in plate 34 and has at its outer extremity a handle or crossbar 50, by means of which it may conveniently be manipulated. When the pin is withdrawn, it will be apparent that there is no connection between sprocket 36 and plate 34, so that the sprocket and reel 30 may rotate independently of each other. However, when pin 46 is inserted in the perforation in sprocket 36, the latter sprocket is connected to plate 34 so that a driving connection of reel 30 to the motor of the chain saw is established.

To prevent reel 30 from inadvertently unreeling a ratchet 52 is placed on the end of shaft 28 opposite plate 34. This cooperates with a pawl 54 pivotally mounted on a pin 56, extending outwardly from arm 12 of the frame.

Means also are provided for anchoring the apparatus to a stationary support member so that it may be operated satisfactorily when dragging a heavy cable. In the illustrated form, the anchoring means comprises a pair of spaced apart spurs, one of which is indicated at 58. These depend respectively from frame members 12, 14 and are interconnected by crossbar 60. The spurs are sharpened at their outer extremity so that they may be driven into a log, stump or other conveniently located support member, thereby stabilizing the apparatus.

Operation

In operating the logging cable haulback apparatus of my invention, the blade of a chain saw is removed after the tree felling and bucking operations have been completed. Then the presently described apparatus is affixed to the power unit of the saw in place of the chain bar by means of a cap screw and bar bolt inserted through perforations 16 and 18 of arms 12, 14 respectively.

The assembled unit then is transported to the log location, either by carrying it or, if the location is a steep hillside, by running the cable 32 up the hill and affixing it to a stationary object, such as a tree. The operator picks up the apparatus and connects the reel to the motor. The latter then will pull the operator up to the log location at a speed commensurate with the motor speed.

Next, a suitable length of line 32 may be unreeled and carried or thrown to the tractor where it is attached to the chokers and drum line, reel 30 being disconnected from the motor during this operation.

The apparatus is fixed by means of spurs 58 on a log or stump, care being taken to align it properly with the tractor drum. Pin 46 then is inserted in sprocket 36, thereby interconnecting shaft 28 with the motor of the chain saw. When power is applied, the reel is rotated, winding line 32 and dragging the chokers and drum line to the operator. The power then is shut off and pawl 54 engaged with ratchet 52 while the chokers are set about a log.

After this operation has been completed, the tractor operator starts the drum on the tractor, reeling in the drum line and attached log. If desired, the haulback wire 32 may be attached to the log and thus returned to the tractor for returning the chokers and cable to the logging location. Alternatively, it may be cast or carried to the tractor location. In either case, after the log has been disconnected at the tractor, the haulback line may be employed to return the chokers and drum line to the logging location for attachment to another log.

Thus, it will be apparent that by the present invention, I have provided logging cable haulback apparatus which is simple in construction and readily operable in connection with tractor logging. It requires no special rigging, and employs the power unit of a conventional chain saw. By its use, it is possible to log efficiently inaccessible areas on rugged terrain. It also is possible to log with a tractor during winter weather when the ground is wet and soft, since a tractor operating on a logging arch road may retrieve logs without leaving the road and becoming mired. Still further, the haulback apparatus of my invention has many incidental but valuable uses, such as in changing the haulback block, or in pulling the donkey haulback line up steel hillsides in high lead logging.

It is to be understood that the form of my invention, herewith shown and described, is to be taken as a preferred example of the same, and that various changes in the shape, size and arrangement of parts may be resorted to without departing from the spirit of my invention, or the scope of the subjoined claim.

Having thus described my invention, I claim:

A winch apparatus for use with the power unit of a light weight, manually portable chain saw including a motor, mounting means for detachably securing a saw bar to the power unit in operative relation to the motor, and a drive sprocket for driving a saw chain mounted on said bar; said winch apparatus comprising a frame, a winch spool rotatably mounted on said frame, dogging means on said frame positioned rearwardly of the axis of said spool and pointing forwardly and downwardly beneath said spool for engaging a support and anchoring the winch when in use, means on said frame for attaching the frame to the power unit of a chain saw in place of the saw bar thereof, and drive means on said frame for driving the spool from the saw chain drive sprocket of the power unit to which the frame is attached.

References Cited in the file of this patent

UNITED STATES PATENTS

| | | |
|---|---|---|
| 818,114 | Oster | Apr. 17, 1906 |
| 1,046,800 | Kawasaki | Dec. 10, 1912 |
| 1,063,984 | Leland | June 10, 1913 |
| 1,233,797 | Maberry et al. | July 17, 1917 |
| 1,684,857 | Appleby | Sept. 18, 1928 |
| 2,351,739 | Blum | June 20, 1944 |
| 2,432,567 | Forrest | Dec. 16, 1947 |
| 2,501,390 | Jeffreys | Mar. 21, 1950 |
| 2,567,526 | Nitkey | Sept. 11, 1951 |
| 2,636,524 | Leckington | Apr. 28, 1953 |

FOREIGN PATENTS

| | | |
|---|---|---|
| 513,050 | Great Britain | of 1939 |
| 690,453 | Germany | Apr. 25, 1940 |
| 817,831 | France | May 31, 1937 |
| 881,095 | France | Jan. 15, 1943 |
| 302,285 | Italy | Oct. 24, 1932 |